(12) United States Patent
Cheatle et al.

(10) Patent No.: US 8,054,343 B2
(45) Date of Patent: Nov. 8, 2011

(54) IMAGE CAPTURE METHOD AND APPARATUS

(75) Inventors: Stephen Philip Cheatle, Bristol (GB); Andrew Arthur Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 581 days.

(21) Appl. No.: 11/491,953

(22) Filed: Jul. 25, 2006

(65) Prior Publication Data

US 2007/0030363 A1 Feb. 8, 2007

(30) Foreign Application Priority Data

Aug. 5, 2005 (GB) .................................. 0516081.7

(51) Int. Cl.
*H04N 5/262* (2006.01)
*H04N 7/14* (2006.01)
*G06K 9/32* (2006.01)

(52) U.S. Cl. ...................... 348/239; 348/14.01; 382/294

(58) Field of Classification Search .................. 348/154, 348/187, 239, 294, 14.1; 382/294
See application file for complete search history.

(56) References Cited

U.S. PATENT DOCUMENTS

| | | | |
|---|---|---|---|
| 6,396,961 B1 * | 5/2002 | Wixson et al. ................ | 382/294 |
| 6,904,184 B1 | 6/2005 | Taylor | |
| 6,930,715 B1 * | 8/2005 | Mower ........................... | 348/239 |
| 2001/0048815 A1 * | 12/2001 | Nakajima et al. ............. | 396/310 |
| 2003/0076408 A1 * | 4/2003 | Dutta .............................. | 348/61 |
| 2003/0122945 A1 * | 7/2003 | Muramatsu .................... | 348/239 |
| 2004/0201756 A1 | 10/2004 | VanBree | |
| 2004/0208114 A1 * | 10/2004 | Lao et al. ....................... | 369/125 |
| 2005/0088546 A1 * | 4/2005 | Wang ............................ | 348/239 |
| 2006/0033817 A1 * | 2/2006 | Ishikawa et al. ............ | 348/208.2 |
| 2006/0114336 A1 * | 6/2006 | Liu ............................... | 348/231.3 |
| 2006/0133663 A1 * | 6/2006 | Delaney ........................ | 382/152 |
| 2006/0176364 A1 * | 8/2006 | Lai et al. ..................... | 348/14.01 |
| 2006/0187317 A1 * | 8/2006 | Montulli et al. ............ | 348/231.5 |

FOREIGN PATENT DOCUMENTS

| | | | |
|---|---|---|---|
| JP | 07015657 A | | 1/1995 |
| JP | 2002 094854 | * | 9/2000 |
| JP | 2002-094854 | * | 3/2002 |
| JP | 2002094854 | * | 3/2002 |

OTHER PUBLICATIONS

Canny Edge Detection, "Image Processing, Analysis and Machine Vision," Sonka, Hlavac and Boyle, Chapman Hall, 1993.
UK Search Report for GB0516081.7 dated Oct. 10, 2005.

* cited by examiner

*Primary Examiner* — Trung Diep

(57) ABSTRACT

A method for generating an image sequence using an image capture device, the method comprising using image data generated using the device and representative of an existing image of a sequence to assist a user of the device to capture one or more subsequent images for the sequence in order that said existing and the or each subsequent image are captured at substantially the same location and device orientation, and an image capture device operable to assist a user in generating an image sequence.

22 Claims, 5 Drawing Sheets

IMAGE CAPTURE METHOD AND APPARATUS

CLAIM TO PRIORITY

This application claims priority from co-pending United Kingdom utility application entitled, "Image Capture Method and Apparatus" having serial no. GB 0516081.7, filed Aug. 5, 2005, which is entirely incorporated herein by reference.

FIELD OF THE INVENTION

The present invention relates generally to the field of image capture, and more specifically to the field of time-lapse image capture.

BACKGROUND

It can be desirable to capture a number of images in the form of a time-lapse image sequence in order to track development of a particular object or scene over time. For example: changing weather; growth of plants; changing seasons; development of children etc. are all things which can be monitored using a sequence of images captured at respective different times. The time period of interest can be relatively long—for example, weeks, months, a year, or multiple years, or in certain circumstances can be short.

It is currently difficult for a photographer, especially a consumer photographer, to reliably generate a time-lapse image sequence. This is due to a number of factors including: The time period is typically too long for a image capture device such as a digital camera or videocamera to be left in one place; the camera may be needed for other uses; the location may not be secure enough to leave a camera; or the location may not offer adequate protection against the weather, for example.

Furthermore, in the case of moving/animate objects, such as people for example, the subject needs to be re-positioned before each image is captured in order that a sequence accurately depicts a change in some property of the subject over time.

Conventionally, time-lapse photography is effected by leaving a camera permanently in position and set to automatically take photographs separated by a pre-set time interval. This is inappropriate for the long-term time-lapse photography described above, and for consumer-type image capture devices.

SUMMARY

According to a first aspect of the present invention, there is provided a method for generating an image sequence using an image capture device, the method comprising using image data generated using the device and representative of an existing image of a sequence to assist a user of the device to capture one or more subsequent images for the sequence in order that said existing and the or each subsequent image are captured at substantially the same location and device orientation.

According to a second aspect of the invention there is provided a method of processing image data generated using an image capture device, the method comprising capturing an image for an image sequence, the image comprising first image data generated using the device, for a subsequent image of the sequence, generating second image data, comparing first and second image data in order to generate device alignment data providing a measure of a degree of movement of the device necessary to align the device such that the captured image and a subsequent image are framed at substantially the same relative device position and orientation, and capturing a subsequent image for the sequence when a desired level of alignment is achieved.

According to a third aspect of the present invention there is provided an image capture device comprising a processor, the device operable to process image data generated using the device, the data representative of an existing image of a sequence, in order to generate alignment data to assist a user of the device to capture one or more subsequent images for the sequence in order that said existing and the or each subsequent image are captured at substantially the same location and device orientation.

BRIEF DESCRIPTION OF THE FIGURES

For a better understanding of the present invention, and to further highlight the ways in which it may be brought into effect, various embodiments will now be described, by way of example only, with reference to the following drawings in which:—

DETAILED DESCRIPTION OF THE PREFERRED EMBODIMENTS

Figure 1:
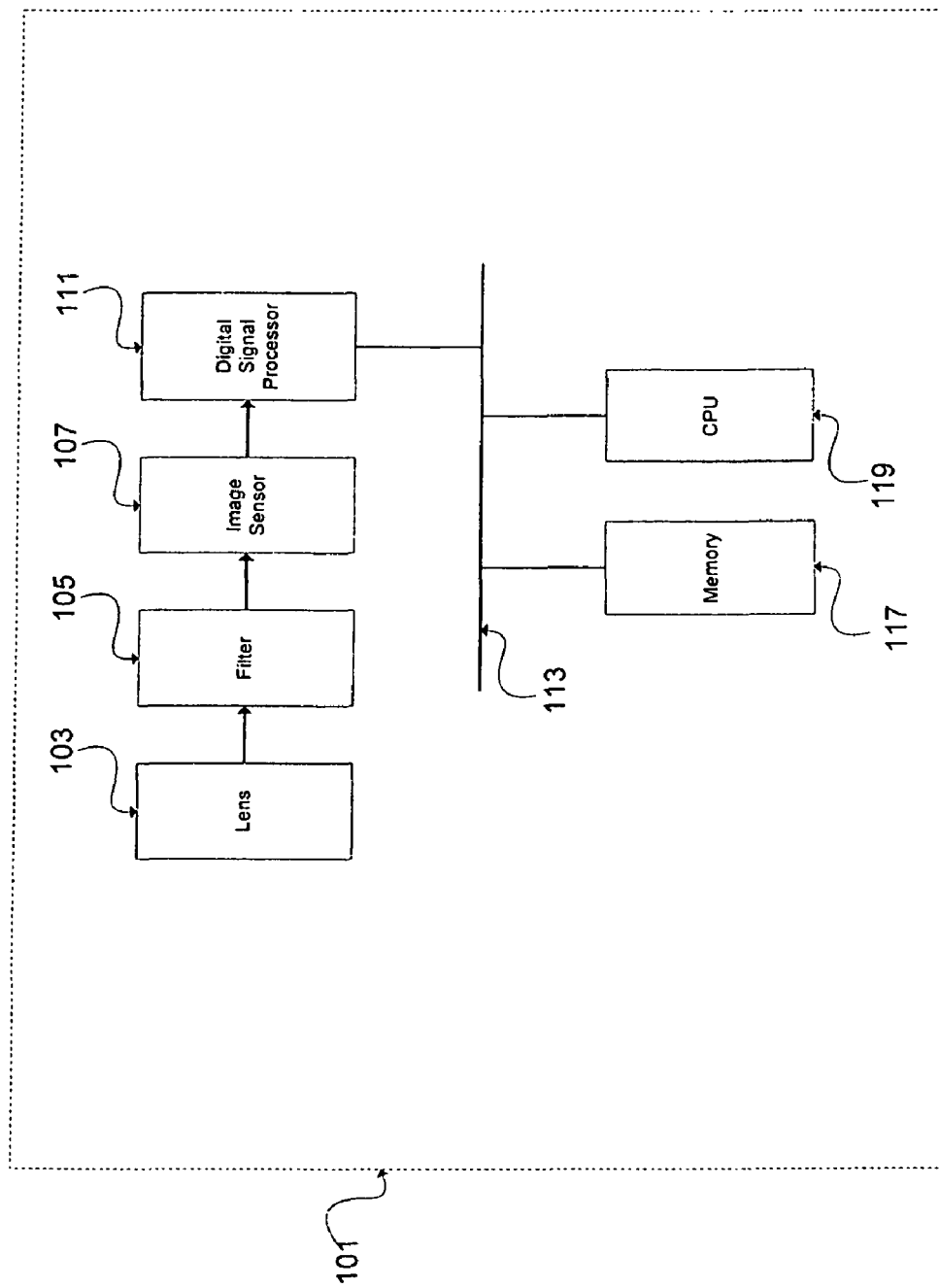
FIG. 1 is a schematic representation of an image capture device according to a preferred embodiment.

FIG. 1 is a schematic representation of an image capture device according to a preferred embodiment.

The device 101 comprises a lens assembly 103, a filter 105, image sensor 107, and a digital signal processor 111. A subject or scene of interest is captured from light passing through the lens assembly 103. The light may be filtered using the filter 105. The image is then converted into an electrical signal by image sensor 107 which could be a CCD or CMOS device for example. The raw image data is then passed to the digital signal processor (DSP) 111.

Further, with reference to the device 101 of FIG. 1, a bus 113 is operable to transmit data and/or control signals between the DSP 111, memory 117, and the central processing unit (CPU) 119.

Memory 117 may be dynamic random-access memory (DRAM) and may include either non-volatile memory (e.g. flash, ROM, PROM, etc.) and/or removable memory (e.g. memory cards, disks, etc.). Memory 117 may be used to store raw image digital data as well as processed image digital data. CPU 119 is a processor operable to perform various tasks associated with the device 101.

It should be noted that there are many suitable alternative different configurations for the device of FIG. 1. In one embodiment, the CPU 119 and the DSP 111 may reside on a single chip, for example. In other embodiments, the CPU 119 and DSP 111 reside on two or more separate chips, for example. Further combinations are possible, but it should be noted that the exact architecture of the device 101 and/or the components therein as outlined above are not intended to be limiting.

According to a preferred embodiment, an image capture device such as that described above with reference to FIG. 1 includes the necessary functionality in order to provide a system for enabling and aiding a user of the device to effect capture of time-lapse image sequences. More specifically, the system provides, amongst other things, one or more of the following:

1) functionality to prompt a user to take images regularly, and at specific time intervals for example; and/or
2) functionality to aid a user to return to substantially the same viewpoint and align images accordingly so that subsequent images in a sequence are captured in substantially the same area as those captured before; and/or
3) functionality to automatically group images taken at different times; and/or
4) functionality to automatically compensate for minor differences in capture position, and varying lighting conditions, for example.

For example, the functionality can be provided by a suitable programmed processor of the device, and the device can be provided with suitable software for effecting the above. The software can be downloaded to the device using a wired or wireless link, or can be provided pre-programmed in memory 117 of the device, with the option to update etc as necessary/desired.

Device 101 can have a control to enable a user to mark a captured image as the first, or as a 'tag image' in a time-lapse project—i.e. a sequence of images captured at respective different times in order to monitor the temporal progression of an aspect of a scene or object in question. The control can be a button of the device, a menu item, or other suitable alternative. The project tag image is advantageously the first image of a time lapse project, and is the image used for the purposes of alignment with future images for the project as will be explained below in greater detail.

The device can prompt the user to enter the desired capture frequency of a project, and the system can then give the user a reminder when the next image is due to be captured. A reminder may occur when the device is switched on at a time near or after the due time, for example. The reminder can also occur on a cooperating electronic device such as a PDA, PC, mobile phone or watch in addition to, or instead of on the device itself, and device 101 can be synchronised with such a cooperating device in order to exchange data relating to a project such as image data, reminder data or other project data, perhaps in the form of metadata for example.

Reminders can be inhibited until the user is located geographically close to the point where an image needs to be captured. For example, device 101 can include GPS functionality, in which case it can determine its location and react accordingly when a geographical location close to an area at which an image of a sequence has been captured is approached by prompting a user to capture an image for example. Such prompting can occur only if the device is switched on, or alternatively, the device can issue a reminder to a user even if it is switched off, using a flashing light for example. Other alternatives are possible.

Advantageously, if the device's memory in which images are stored is cleared by a user, at least one of the images in any time-lapse project can be retained in a device memory so that the project may be continued. For example, a user may decide that a sequence of images is unsuitable, and therefore chose to delete a certain number, or all of the images in the sequence. The device 101 can prompt the user that deletion of all images will result in the sequence being lost—at this point, and if the user chooses appropriately, only some images in the sequences can be deleted such that the initial sequence image, for example, is maintained thereby allowing the sequence to be continued. At a minimum, a low resolution version of a single image from the time-lapse project can be retained. The resolution of this image should be at least suitable for viewfinder display of the device 101 in order to enable that image to be used for the purposes of alignment with future images to be captured for a project.

Preferably, if a user initiates a device procedure to clear a device memory, thereby potentially deleting all images stored therein, the device can prompt the user that this action will result in the deletion of all time-lapse projects, including the project tag images. The user can be given the option of deleting all images, deleting all images except those comprising time lapse projects, or deleting all images except project tag images. Other alternatives are possible. For example, when deleting images, an incomplete project can be saved.

To capture the next image in the time-lapse project the user identifies the project they wish to add to. Preferably this is done by indexing through a set of project tag images, one per time-lapse project, and selecting a particular project tag image. As explained, the project tag image may be the first of the project, the most recent in the project or an arbitrary image in the time-lapse project set, selected by the user for example. Other alternatives are possible. For example, the project tag image for a particular project need not comprise of an image from the project. Instead it can be any arbitrary image or symbol, which can be particularly advantageous if a viewfinder or display resolution is insufficient to allow a captured image to be used as a tag. Preferably, in such a case, the tag image will be user selected in order that it can be remembered.

Preferably, an image which is to form part of a sequence for a time-lapse project can be captured with assistance from the device 101 in determining a device position and/or orientation. In order to obtain an accurate and/or pleasing and/or reliable sequence of images for a project which map the temporal evolution of a particular subject or scene attribute, it is desirable for device 101 to be located in substantially the same relative position each time an image is captured for the sequence in question, or as close to a previous position as practicable. To this extent, device 101 can assist a user in the positioning and/or orienting the device so that images for a sequence are, as near as possible, captured in substantially the same position and manner for all images of the sequence. Advantageously, device 101 can comprise GPS functionality to determine a current location of the device, and enable a desired location to be determined. The GPS functionality can be in the form of a device-integral, or external, GPS unit for example. The GPS functionality can be used to determine a current location of device 101 and inform the user where/how far to move in order to get the device into substantially the correct area for capturing images for a given sequence. The desired area can be determined from the position data contained in header data or metadata of a given project tag image for example. Various methods of indicating which direction the user needs to move are possible. The simplest is a direction arrow shown on a display of device 101, together with a distance to travel, for example. The device can further assist a user in a number of ways. For example, the device can augment a current view of a scene with a marker, or similar, indicating the point in the view where the project tag image was captured.

When device 101 is approximately in the correct location, an electronic viewfinder, or display, of the device (not shown) can behave in an 'alignment assistant' mode in order to assist the user to determine a more precise location and/or orientation of the device once the general desired location has been located/reached using the GPS functionality. The device preferably assists a user to make final adjustments to relative position and/or orientation in order to ensure that subsequent images for a sequence are captured at substantially the same position and/or device orientation as previous images for sequence.

Various methods can be adopted to assist the user in the alignment assistance mode of the device. For example, the image presented to the user representing that which is in the field of view of the device at that instant can be a combination of the project tag image and the current device view, for example. In this way the user can position device 101 such that it is viewing the scene in the same way as when the project tag image was captured. The combination can be effected in a number of ways. For example, the current view and the project tag image can both be half bright images superimposed/overlapped. For example, as is generally commonplace, an image to be captured can be displayed in real time (or near real time) on a screen or in a viewfinder (not shown) of the device. The overlap can involve the whole of the tag image being overlapped with that of the image to be captured, for example. Alternatively, an image to be captured and a tag image can be displayed alternately, perhaps for one second each, or by explicit user control to toggle between the two views.

Further alternatively, a combination of a project tag image and current camera view can be displayed to a user by means of an edge enhanced version of the project tag image superimposed on the current camera view. This can emphasise the alignment. Edges in the image can be determined using known techniques such as the Canny edge detector—see "Image Processing, Analysis and Machine Vision", Sonka, Hlavac and Boyle, Chapman Hall, 1993 for example. The combination of project tag image and current device view can be in the form of a low frequency temporal flicker between the two, (showing each image for around 1 second each for example). Other alternatives are possible. For example, both images can concurrently shown (side by side for example) on a device display or viewfinder if such a display is of sufficient size to enable this.

Further alternatively, the device can assist a user by presenting a direction and distance for the device to be moved to a user using a display of the device in order that an existing image and a subsequent image are captured at substantially the same location and device orientation. Alternatively, or as well, the device can provide audio signals to a user of the device using a loud speaker of the device for example, the signals indicative of a direction and/or distance for the device to be moved. The signals can be in the form of beeps or other such sounds, and/or can comprise audible instructions such as "left", "right", "up", "down" etc, in combination with a distance to move in the direction. In general, any suitable aural, visible or tactile signal (e.g. the device can vibrate to indicate a direction or indicate that a user is close to or far from a desired position/orientation) can be provided to the user to indicate a distance and/or direction for the device to be moved.

Device 101 can automatically set and fix a zoom setting of the device to that used when the project tag image was captured. This has the advantage that the user will be encouraged to capture an image for a sequence from a similar distance as other images in the sequence in order to align the current view with the project tag image. Advantageously, this also means that the perspective will be matched correctly for the images of a sequence.

Figure 2:
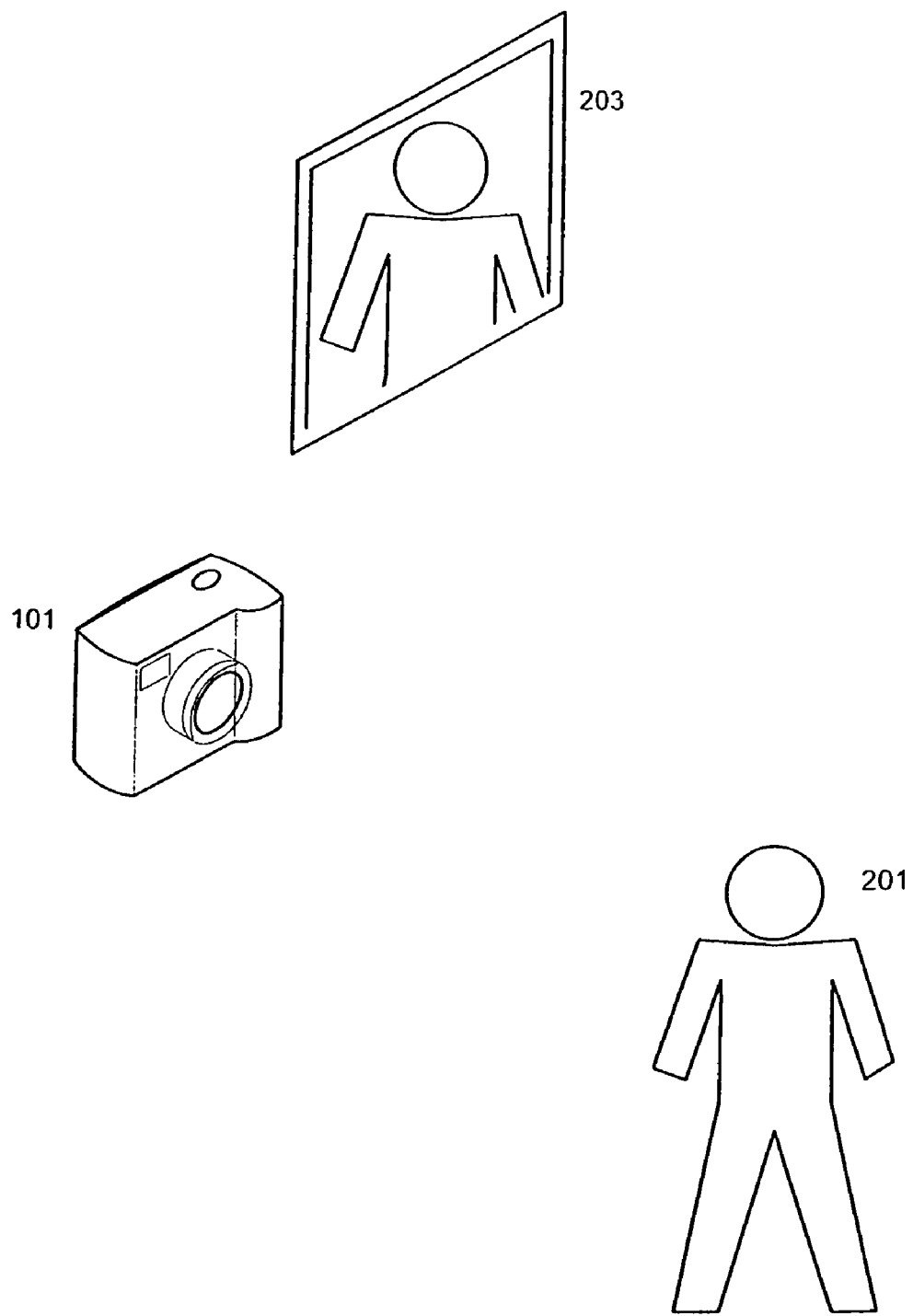
FIG. 2 is a schematic representation of a system according to an embodiment.

In the case of time-lapse projects of people or groups of people, the pose expressions of the subjects can be important. In these cases a viewfinder image, showing the combination of a project tag image and current device view can be shown to a user on a separate display tablet (not shown), visible to the image subjects. By comparing how they are currently viewed by the device, and how they appear in the project tag image, they can adjust their pose and expression to best match the relevant project tag image. Other alternatives are possible. FIG. 2 is a schematic representation of an exemplary set-up a system including a display visible by image subjects.

Device 101 and subject 201 are in a desired relative position for capturing an image for a project. A subject 201 is depicted. Behind device 101 is a display 203 such as a tablet display for example. Display 203 is oriented towards subject 201 so that the subject is able to see it clearly. The display is connected to device 101 using a wired or wireless link (not shown). The image displayed by device 101 to a user is transmitted to display 203. Subject 201 can therefore adjust their relative position etc in order to align themselves correctly.

When the user captures a new image, device 101 can automatically set and fix various exposure parameters to those used when the project tag image was captured. For example, tonal mapping curves and adaptive lighting modes can be adjusted by device 101 as appropriate.

According to a preferred embodiment, each image in a time-lapse project can be automatically allocated a common tag, in order that the images within the project can be collected together by other image processing software, such as photo-management tools like HP ImageZone or Adobe Elements for example. Accordingly, software can be provided to enable a user to download a sequence of captured images in a project to a computer or similar for further processing. The collection of relevant images to form a sequence once downloaded can be achieved by image downloading software ensuring that all images in a time lapse project are placed in a common folder for example. Alternatively the same can be achieved by giving images of a project sequence filenames such as "TIME-LAPSE-NNNN-SSS". Here, NNNN is a sequential count of the time-lapse projects generated by the relevant image capture device, and SSS is a sequence number of the images within the project. Alternatively it could be achieved by providing all images with a common "tag" such as "TIME-LAPSE-NNNN". Such a tag could be recorded in the image meta-data such as the JPEG EXIF keyword field for example. Other alternatives are possible. Photo management applications which are aware of time-lapse projects could automatically use the project tag image as a visual icon for the project.

Images in a time-lapse project will typically be taken under different lighting conditions and slightly different locations, despite the assisted manual alignment as described above. Advantageously, automated means can be provided in device 101 to normalize the images as much as possible. This has the advantage that when watching the time-lapse progression in sequence, any disturbing effects such as variation in lighting and/or positional shifts in images are minimized. Spatial alignment can be normalized by identifying a set of feature points which are visible in all images and locating their position in each image. In the case of images of faces, the location of the centre of the eyes can be explicitly detected and used as preferred feature points. Once the set of common feature points is determined, each image can be transformed so that it is aligned with the first image as well as possible (using known techniques such as a RANSAC fit of an affine transform for example). Other alternatives are possible. Image parameters such as hue/contrast etc can be adjusted using known techniques.

If "in-between" frames are to be generated in order to assist in the formation a video which morphs between the images in a project, common feature points can be used as initial anchors in the morph point alignment. Further points can be found to define a mesh used for the morph, using standard morphing techniques. Other alternatives are possible.

Exposure and colour can be normalized by forming an intensity histogram for each image, matching the histograms, and adjusting the histograms to match (using known techniques such as those found in Adobe Photoshop CS, for example). Other alternatives are possible.

Advantageously, functionality can be provided in device 101 to enable a user to terminate a time-lapse project, thereby stopping further reminders and allowing the freeing up of memory space within the device. Typically this would be by selecting a time-lapse project as described above and choosing a "complete" option using a device menu system for example. In the case of cooperating electronic timer devices as described above, the terminate command would cause the timers for that project to be deleted. The user could also initiate project termination in response to a timer alert from one of the cooperating electronic devices. The cooperating device in question would communicate this action to the device 101 and any other cooperating devices using a wired or wireless link for example.

According to an embodiment, device 101 can opportunistically suggest to a user that they create a time-lapse project. This can occur when the device detects that it is in the same location as it was on a previous occasion for example (and if it has GPS functionality for example, or is able to receive a signal from the external environment indicative of its location). The device can show the user the image captured at the nearby location and ask whether the user wishes to create a time-lapse project. Alternatively the initiative may be taken by the user by allowing the user to ask the device for "images taken near here". The user can then retrospectively mark one of the images as the start of a time-lapse project.

As time-lapse projects can extend over a number of years it is likely that a user will change from one image capture device to another during the time period of one or more time-lapse projects. To support this, a means can be provided to download a partial time-lapse project from one device to another. This may be by a direct connection, or through a device download application. One method of achieving this is to embed the necessary information in the EXIF header of the project tag image. This information includes at least: a project identifier; capture frequency; and last image capture time. Additional details can include: GPS/location data; focal length; and exposure details, and any other device settings for example. When the images are uploaded to a new camera, it can detect the associated time-lapse data and use this to reconstruct the time-lapse project in question.

Figure 3:
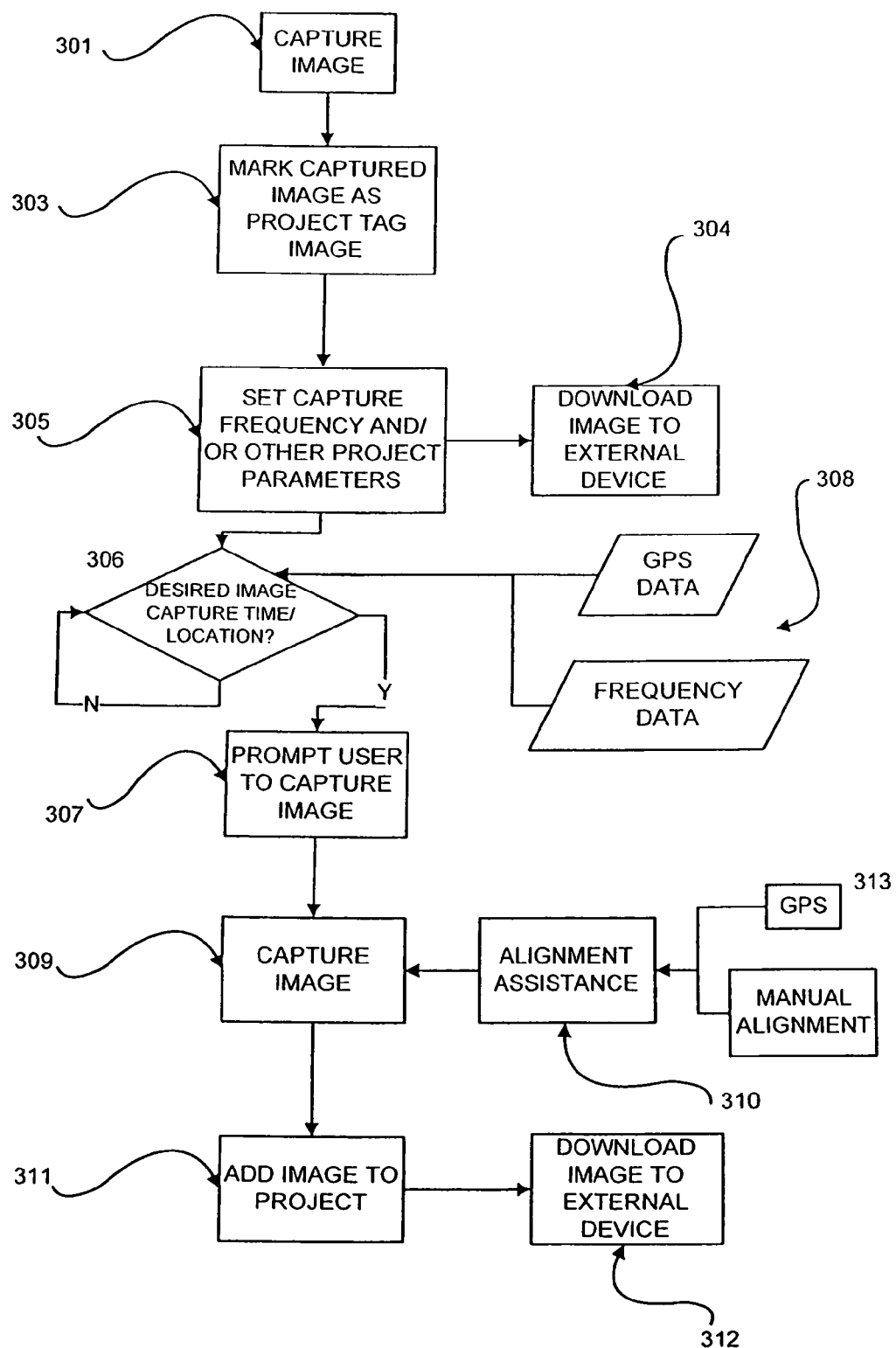
FIG. 3 is a flow diagram representing an image capture procedure according to an embodiment.

FIG. 3 is a flow diagram representing an image capture procedure according to an embodiment.

At step 301 a user of device 101 captures an image of an object or scene of which a time-lapse project is desired. At step 303, the captured image is marked, preferably using a menu system of the device, as a project tag image. At 305, and following the assignment of the project tag image identifier to the captured image, the user is prompted by the device to set certain parameters for the project such as frequency of capture, whether any cooperating devices are to have reminders downloaded thereto etc. In the case that it is desirable for reminders to be downloaded to an external device, device 101 can prompt a user to perform such action at this stage or it can be deferred until a later time, for example, when the image capture device 101 is synchronised with an external device.

The project tag image can be downloaded (step 304) to an external device such as one of the cooperating devices described above.

At step 306, which can occur at a time substantially after step 305 etc has been executed, device 101 determines if it is in a desired location, and/or if it is a desired time for capture of an image for a sequence. The device can determine its location using GPS functionality (308) or with reference to external stimuli, such as an external signal from a specific location indicating to the device that it is in a particular area for example. The device can continually monitor its location, even when powered off if a GPS unit of the device allows (perhaps by virtue of a separate power supply for example, or a separate link to the device power supply), or it can determine a current location whenever it is powered up, and then determine if such a determined location corresponds to a desired location for image capture for a sequence. A desired time to capture an image for sequence (as determined from a current time, and the frequency of capture (308) for example) can also be monitored continuously or determined when the device is powered on.

If the device determines that it is in a desired location and/or it is a desired time for image capture for a sequence the flow chart proceeds to step 307. If not, step 306 loops until such time as a desired location and/or time is reached.

At step 307, device 101 can prompt a user to capture an image which is to form part of the project which has been initiated. The prompt can be using a display or loudspeaker of the device 101 or an external device for example, and can be in response to the fact that the device 101 has determined that it is in the vicinity of the location where the project tag image was captured.

At step 309 a user captures an image for the project. The capture of this image can be subject to alignment assistance (310) as described above. More specifically, a location for device 101 can be determined using GPS data (313). Following this, a more accurate alignment of the device can be effected manually as described above.

At step 311 the captured image is added to the project. This can be by storing the image in a memory of device 101 and adding data or metadata into a header of the image to indicate which project it relates to for example. Other alternatives are possible. The captured image assigned to a project can be downloaded at 312 to an external device if desired.

Figure 4:
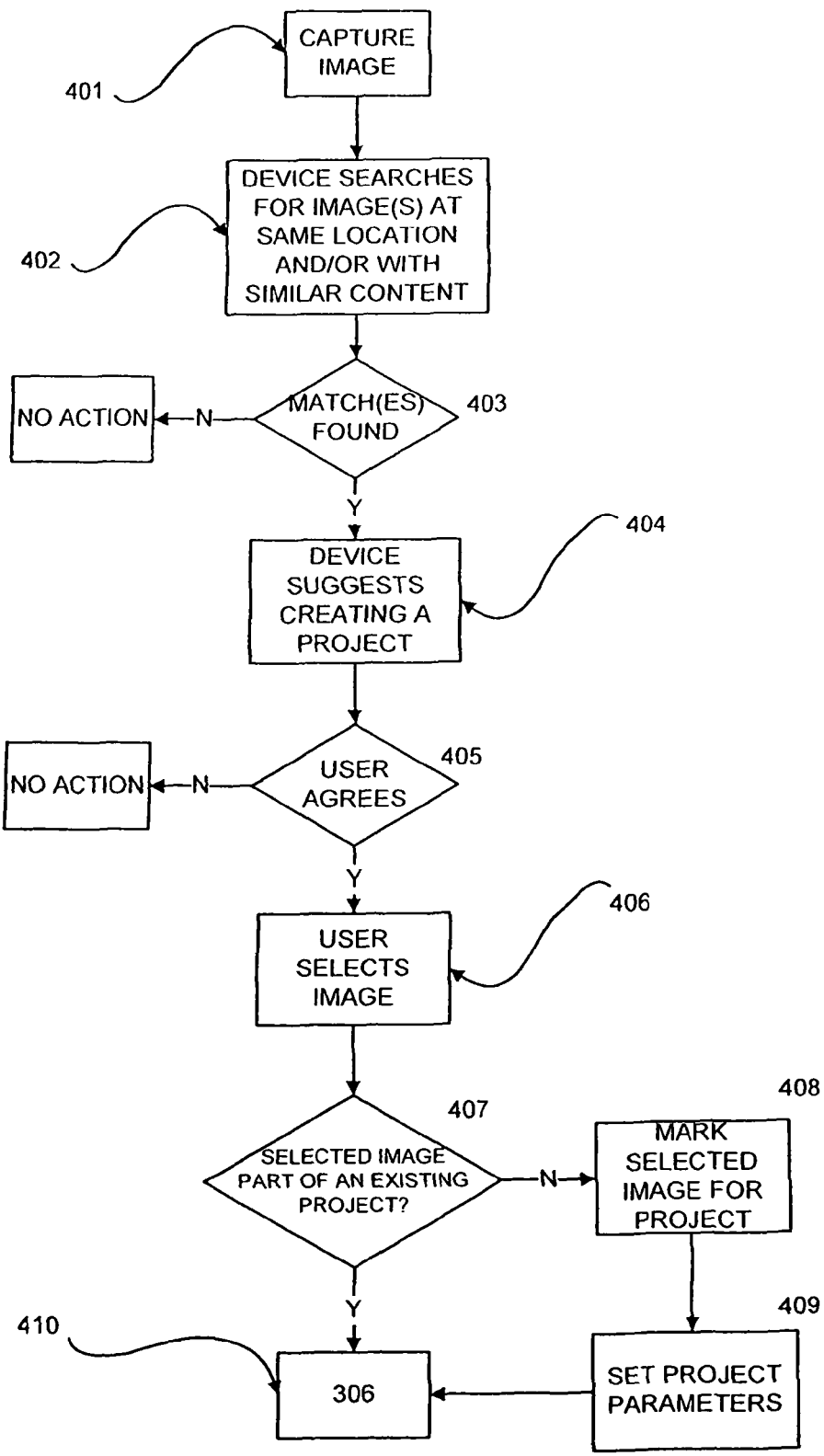
FIG. 4 is a flow diagram representing an image capture procedure according to an embodiment.

FIG. 4 is a flow diagram representing an image capture procedure according to an embodiment. At step 401 an image is captured by a user of device 101.

At step 402 device 101 determines if there are stored images in its memory which were taken at substantially the same location as the image captured at 401 (but at a significantly different time, i.e. not two seconds ago for example), and/or if there are images stored in its memory with a similar content to the captured image. For example, a portrait of a person can comprise a relatively close-up view of the persons face, and a blurred background to accentuate the face. Device 101 can determine a content of a recently captured image using known techniques, and determine if a previously captured image for a sequence comprises similar content. So, for example, face recognition techniques can be applied in order to determine if a recently captured portrait corresponds to one captured previously, and relate the image captured at 401 to the previous image of the same person. Either determination above can be performed automatically by device 101 in response to a captured image, or in response to a determination of location and/or time, or in response to user input specifying that such a determination(s) be performed by the device.

So, for example, if a user captures an image, that image can automatically be processed in order to determine its content, which content can be compared with previous images in order to determine if the image can form part of a project.

Alternatively, following an image capture, device 101 can determine a location where the image was captured, and compare this location with that of previously captured images in order to determine if the captured image can form part of a project.

At 403, if a match corresponding to one of the above is not found, no action is taken by the device. Alternatively, the device can inform a user that no match was found, especially if the user requested the search.

If a match is found, the device can suggest to the user that a time-lapse project is created (404). The suggestion can be based on the determination that the image captured at 401 contains material suitable for inclusion in a project, or the device can suggest that a project be created without regard to the image content.

The user can either accept the suggestion, or decline the suggestion, in which case no further action is taken by the device.

If a project is to be created, the user can select an image which is to be the tag image for the project (406). AT 407 it is determined if the selected tag image already forms part of a project. If it does not, it is marked as a project tag image (408), and the user can then be prompted to enter details for the project such as the capture frequency etc (409) as explained above.

In both cases the procedure from step 306 of FIG. 3 begins. The image captured at 401 will not generally form part of a project since it has not been aligned with other images.

Figure 5:
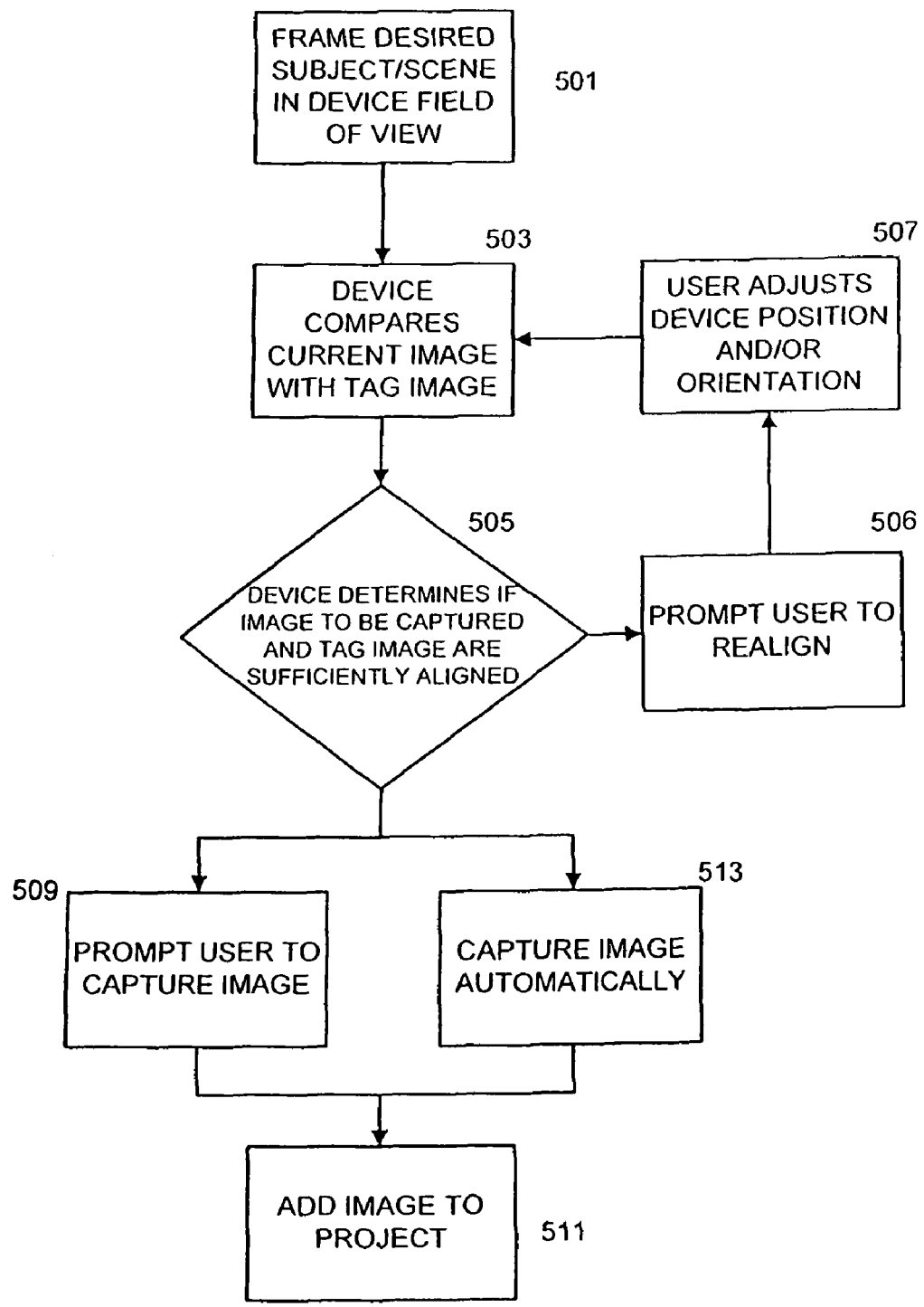
FIG. 5 is a flow diagram representing a procedure for assisting a user to align an image with one previously captured for a project.

FIG. 5 is a flow diagram representing a procedure for assisting a user to align an image with one previously captured for a project. At step 501 an image to be captured is framed by a user in a field of view of device 101. At step 503, device 101 compares image data representing the image to be captured with image data representing an image in the relevant project, and preferably with the project tag image. The device determines if the image to be captured is sufficiently aligned with the captured image to within a desired level. This can be by using GPS functionality of the device in combination with alignment assistance as described above, or by using alignment assistance alone.

If, at 505, it is determined by the device that the image to be captured and the tag (or other project) image are not sufficiently aligned, the user can be prompted at 506 by the device to alter the relative position and/or orientation of the device and subject in order to better align the image to be captured with the captured image in the project. The prompt can be effected in a number of ways. For example, an audible prompt could indicate that realignment is necessary. Alternatively, a display of device 101 can display a direction indicator to the user indicating a direction, and optionally a distance, to move the device in order to better align the images. The user adjusts the device in response to the prompt at 507, and the process can repeat until a desired level of alignment is reached. The user can override the alignment process at any time. For example, if alignment is proving difficult, the user can exit and capture the image so that it is added to the project. This can be useful if good alignment with a captured image is not possible because of environmental conditions for example. Alternatively, the device could capture an image automatically (513) if a desired level of alignment is reached.

If it is determined at step 505 that alignment has been sufficiently achieved, the user is prompted to capture the image at 509, and the captured image is then added to the project at 511. Alternatively, as explained, the device can automatically capture an image in response to good alignment.

It will be appreciated that a device will generally have six degrees of freedom of which 3 relate to translational movement of the device, and 3 relate to rotational movement of the device. A user could therefore effect device adjustments in a number of ways.

Two of the three translations can be measured relatively accurately. The third translational movement however, (altitude) is less straightforward to determine reliably. According to an embodiment it can be determined to within a desired degree of accuracy by a user using alignment assistance as described above.

Rotational movements of the device can be measured quite accurately using a digital compass and two tilt detectors oriented at right angles with respect to one another for example.

Device 101 can include sensors to monitor not only device location (e.g. GPS sensor(s)), but sensors in order to monitor changes in device orientation caused by rotation for example, and to determine and record an instantaneous device location and/or orientation. For a captured image, the sensors can generate data representing the device location and orientation at the time of capture, which can be stored in the header (EXIF for example) of the image, or as metadata associated with the image. The relevant data can then be compared with that generated by the sensors for a subsequent image capture operation for the sequence in question in order to determine how much the device should be adjusted and in which way (e.g. translation in a particular direction, or rotation in one or more of the relevant degrees of freedom of the device). The information can be presented to a user via a display of the device 101, and advantageously, three dimensional arrows can be used in order to purvey the information.

Accordingly, the above described embodiments facilitate the capture of sequences of images of an object/subject or scene over a period of time, and ensures that images are captured in as similar conditions as possible. This ensures that when a sequence is viewed the change from one image to the next in the sequence is predominantly the result of a change in the object/subject or scene, thereby permitting the temporal evolution of an object/subject or scene attribute to be monitored.

The invention claimed is:

1. A method for generating an image sequence using an image capture device, the method comprising:
    using image data previously generated by a user using the device and representative of an existing image of a sequence to assist the user of the device to capture one or more subsequent images for the sequence with the device in order that said existing image and said one or more subsequent images are captured at substantially a same geographical location of the device and a same positional orientation of the device,
    wherein the device is operable to inform the user of where and how to move the device to assist the user in establishing substantially the same geographical location of the device and the same positional orientation of the device prior to capturing said one or more subsequent images.

2. A method as claimed in claim 1, wherein the device is operable to adjust exposure parameters of the device for said one or more subsequent images to those used for said existing image.

3. A method as claimed in claim 1, wherein the device is operable to assist the user by presenting an overlay image to the user using a display of the device, the overlay image comprising image data generated using said existing image and a subsequent image captured using the device.

4. A method as claimed in claim 3, wherein the overlay image is a low frequency temporal flicker between said existing and subsequent images.

5. A method as claimed in claim 3, wherein the overlay image comprises said subsequent image combined with an edge enhanced version of said existing image.

6. A method as claimed in claim 1, wherein the device is operable to assist the user by determining a current geographical location of the device, and comparing the determined current geographical location with geographical location data for the existing image, the geographical location data representing the geographical location of the device at the time of capture of said existing image, and, on the basis of the comparison, determining a direction and distance in which the device should be moved in order that said current geographical location of the device substantially corresponds to the geographical location of the device at the time of capture of the existing image, and informing the user of the direction and distance in which the device should be moved.

7. A method as claimed in claim 1, wherein the device is operable to assist the user by determining a current positional orientation of the device, and comparing the determined current positional orientation with positional orientation data for the existing image, the positional orientation data representing the positional orientation of the device at the time of capture of said existing image, and, on the basis of the comparison, determining a necessary rotation for the device in order that said current positional orientation of the device substantially corresponds to the positional orientation of the device at the time of capture of said existing image, and informing the user of the rotation for the device.

8. A method as claimed in claim 1, wherein the device is operable to suggest an image sequence when a geographical location or content of a recently captured image is substantially the same as a geographical location or content of a previously captured image.

9. A method for generating an image sequence using an image capture device, the method comprising:
   using image data previously generated by a user using the device and representative of an existing image of a sequence to assist the user of the device to capture one or more subsequent images for the sequence with the device in order that said existing image and said one or more subsequent images are captured at substantially a same geographical location of the device and a same positional orientation of the device, including presenting to the user a direction and distance for the device to be moved in order to establish substantially the same geographical location of the device and the same positional orientation of the device prior to capturing said one or more subsequent images,
   wherein the device is operable to provide a reminder at a predetermined time that an image for the sequence is to be captured,
   wherein the reminder occurs periodically at a reminder frequency set by the user.

10. A method of processing image data generated using an image capture device, the method comprising:
   capturing a previous image for an image sequence with the device by a user;
   subsequent to capturing the previous image with the device by the user and prior to capturing a subsequent image for the sequence with the device by the user, establishing substantially a same geographical location of the device and a same positional orientation of the device as that used for capturing the previous image with the device by the user, including indicating to the user where and how to move the device for establishing substantially the same geographical location of the device and the same positional orientation of the device prior to capturing the subsequent image for the sequence with the device by the user; and
   subsequent to establishing substantially the same geographical location of the device and the same positional orientation of the device, capturing the subsequent image for the sequence with the device by the user with the device at substantially the same geographical location and the same positional orientation.

11. A method as claimed in claim 10, wherein a reminder that a subsequent image for the sequence is to be captured occurs when the device is switched on at a time near or after a due time for the subsequent image.

12. A method as claimed in claim 10, wherein a reminder for capture of a subsequent image of the sequence occurs when the device is located geographically near to an area in which an image for the sequence is to be captured.

13. A method as claimed in claim 10, further comprising:
   selecting an image of the sequence as a tag image representative of the sequence; and
   associating further images of said sequence with said tag image.

14. A method as claimed in claim 10, further comprising:
   processing image data of the subsequent image and adjusting at least one exposure parameter of the subsequent image on the basis of an exposure parameter of the previously captured image.

15. A method as claimed in claim 10, further comprising, prior to capturing the subsequent image for the sequence with the device by the user, at least one of: presenting a direction and distance for the device to be moved to the user using a display of the device in order that said previous image and said subsequent image are captured at substantially the same geographical location of the device and the same positional orientation of the device; providing audio signals to the user of the device, the signals indicative of a direction and distance for the device to be moved in order that said previous image and said subsequent image are captured at substantially the same geographical location of the device and the same positional orientation of the device; and providing any other aural, visible or tactile signal to the user to indicate a distance and direction for the device to be moved in order that said previous image and said subsequent image are captured at substantially the same geographical location of the device and the same positional orientation of the device.

16. An image capture device comprising a processor operable to:
   process image data previously generated by a user using the device, the image data representative of an existing image of a sequence,
   generate alignment data to assist the user of the device to capture one or more subsequent images for the sequence with the device prior to capturing the one or more subsequent images in order that said existing image and said one or more subsequent images are captured at substantially a same geographical location of the device and a same positional orientation of the device, and
   present to the user a direction and distance of movement of the device in order to establish substantially the same geographical location of the device and the same positional orientation of the device prior to capturing the one or more subsequent images.

17. A device as claimed in claim 16, wherein the processor is further operable to generate, at intervals corresponding to a user selected image capture frequency, a reminder for a user of the device to capture a subsequent image for the sequence.

18. A device as claimed in claim 17, the image capture device further comprising a location sensing device for sensing a geographical location of the device, wherein the processor is further operable to inhibit the reminder until such time as the processor determines, on the basis of location data generated by the location sensing device, that the device is located geographically near to an area in which an image for the sequence is to be captured.

19. A device as claimed in claim 16, wherein the existing image is a tag image for the sequence, and wherein the processor is operable to process data representing the existing image and data representing the subsequent image for capture in order to provide overlap image data representing a combination of the existing image and the subsequent image to be captured, the device operable to present said overlap image data for viewing by a user using a display of the device.

20. A device as claimed in claim 16, wherein the direction and distance of movement of the device are presented to the user using a display of the device.

21. A device as claimed in claim 16, the image capture device further comprising GPS functionality to determine a current geographical location and positional orientation of the device and assist the user to establish substantially the same geographical location of the device and the same positional orientation of the device prior to capturing the one or more subsequent images for the sequence.

22. An image capture device comprising a processor operable to:
   process image data previously generated by a user using the device, the image data representative of an existing image of a sequence,
   generate alignment data to assist the user of the device to capture one or more subsequent images for the sequence with the device prior to capturing the one or more subsequent images in order that said existing image and said one or more subsequent images are captured at substantially the same geographical location of the device and the same positional orientation of the device, and
   indicate to the user where and how to move the device in order to establish substantially the same geographical location of the device and the same positional orientation of the device prior to capturing the one or more subsequent images,
   the image capture device further comprising a wireless communications module operable to transmit and receive data to and from a remote device, wherein the image capture device is adapted to cooperate with the remote device in order to exchange data relating to a frequency of capture of images for the sequence, and data relating to a reminder for image capture for the sequence.

* * * * *